United States Patent
Lin (10) Patent No.: US 7,567,616 B2
(45) Date of Patent: Jul. 28, 2009

(54) FEEDBACK EQUALIZER FOR A COMMUNICATIONS RECEIVER

(75) Inventor: Chia-Liang Lin, Union City, CA (US)

(73) Assignee: Realtek Semiconductor Corp. (TW)

( * ) Notice: Subject to any disclaimer, the term of this patent is extended or adjusted under 35 U.S.C. 154(b) by 658 days.

(21) Appl. No.: 11/230,856

(22) Filed: Sep. 20, 2005

(65) Prior Publication Data
US 2006/0182172 A1 Aug. 17, 2006

Related U.S. Application Data

(60) Provisional application No. 60/593,824, filed on Feb. 17, 2005.

(51) Int. Cl.
*H03H 7/30* (2006.01)
(52) U.S. Cl. ..................... 375/233
(58) Field of Classification Search .............. 375/233
See application file for complete search history.

(56) References Cited

U.S. PATENT DOCUMENTS

| | | | |
|---|---|---|---|
| 6,185,250 B1* | 2/2001 | Wang et al. | 375/222 |
| 6,404,809 B1* | 6/2002 | Zhang | 375/232 |
| 6,570,917 B1* | 5/2003 | Lai et al. | 375/232 |
| 6,600,780 B1* | 7/2003 | Wang et al. | 375/233 |
| 7,130,366 B2* | 10/2006 | Phanse et al. | 375/350 |
| 2005/0025228 A1* | 2/2005 | Stonick et al. | 375/232 |
| 2008/0219390 A1* | 9/2008 | Simpson et al. | 375/355 |

OTHER PUBLICATIONS

Buttle, "A multirate transceiver IC for four-wire full-duplex data transmission", IEEE journal of solid-state circuits, 1991, vol. 26, No. 12, pp. 1928-1935.*
Buttle, "A Multirate Transceiver IC for Four-Wire Full Duplex Data Transmission", 1991 IEEE International Solid-State Circuits conference pp. 234-236.*

* cited by examiner

*Primary Examiner*—Juan A Torres
(74) *Attorney, Agent, or Firm*—Schwegman. Lundberg & Woessner, P.A.

(57) ABSTRACT

A feedback equalizer is provided that minimizes the critical path time in a multi-level modulation receiver. The critical path is reduced by parallel operation of some summation components of the feedback equalizer. The critical path is further reduced by pre-computing coefficients for the feedback equalizer. Further, the critical path is reduced using an adaptive feedback equalizer which uses parallelism or pre-computation to calculate the feedback equalization coefficients using an adaptation engine.

30 Claims, 7 Drawing Sheets

FIG. 1
-PRIOR ART-

-PRIOR ART-

FIG. 2

-PRIOR ART-

FEEDBACK EQUALIZER FOR A COMMUNICATIONS RECEIVER

CROSS-REFERENCE TO RELATED PATENT APPLICATION

This patent application claims the benefit under Title 35, United States Code, section 119(e), of U.S. Provisional Patent Application Ser. No. 60/593,824 filed Feb. 17, 2005 and entitled "Feedback Equalizer for Communications Receiver," by inventor Chia-Liang Lin, the entire subject matter of which is incorporated herein by reference.

COPYRIGHT NOTICE

This patent document contains copyrightable subject matter that may include (by way of example and not by way of limitation) computer software elements, source code, flow charts, screen displays, and other copyrightable subject matter. The following notice shall apply to these elements: Copyright© Realtek Semiconductor Corp., Hsinchu, Taiwan. All rights reserved.

LIMITED WAIVER OF COPYRIGHT

In accordance with 37 CFR section 1.71(e) a portion of the disclosure of this patent document may contain material to which a claim for copyright is made. The copyright owner has no objection to the facsimile reproduction by anyone of the patent document or the patent disclosure as it appears in the United States Patent and Trademark Office patent file or records, as long as the above Copyright Notice remains legible on all copies. The copyright owner reserves all other national and international copyright rights.

FIELD OF THE INVENTION

The present invention relates to communication systems and in particular to feedback equalization in a multi-level modulation communications system to combat channel dispersion.

BACKGROUND OF THE INVENTION

Figure 1:
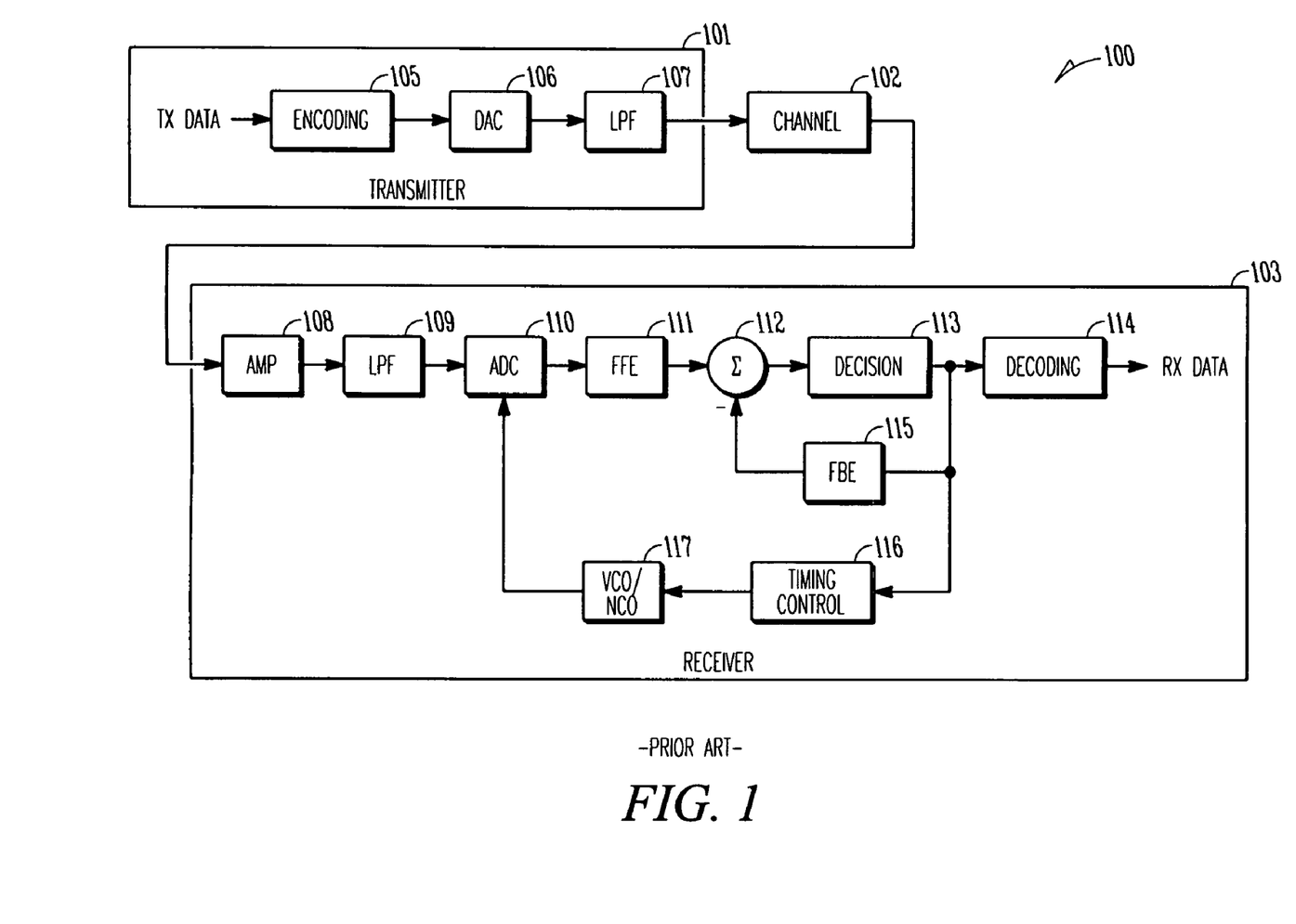
FIG. 1 illustrates a typical prior art communication system.

A feedback equalizer (FBE) has been known in prior art to compensate for the channel dispersion in a communications system. A typical prior art communication system 100 is shown in FIG. 1. The communication system 100 consists of a transmitter 101, a channel 102, and a receiver 103. A typical transmitter 101 includes the following components: an encoder 105 that processes the transmit data (TX data) using a certain encoding scheme, a digital-to-analog converter (DAC) 106 that converts the encoded data into analog voltage waveform, and a low-pass filter (LPF) 107 that filters out the high frequency noises. A typical communications receiver 103 includes the following components: an amplifier (AMP) 108 that compensates for the insertion loss suffered by the transmitted waveform due to the channel 102, a low-pass filter (LPF) 109 that filters out the high-frequency noises, an analog-digital converter (ADC) 110 that converts the analog voltage into digital samples, a feed-forward equalizer (FFE) 111 and a feedback equalizer (FBE) 115 that compensates for the dispersion suffered by the transmitted waveform due to the channel 102, a summer 112, a decision device 113 which determines the most likely encoded TX data transmitted from the transmitter 101, a decoder 114 which performs the decoding and recovers the original TX data. A typical receiver 103 also includes a timing control unit 116 and a voltage controlled oscillator (VCO) 117 or a number controlled oscillator (NCO) 117, which generates a clock signal that is in synchronization with the clock used by the remote transmitter 101. The local clock signal is provided to sample the analog waveform at the input of the ADC 110, and also to synchronize all the digital circuits in the receiver 103.

Figure 2:
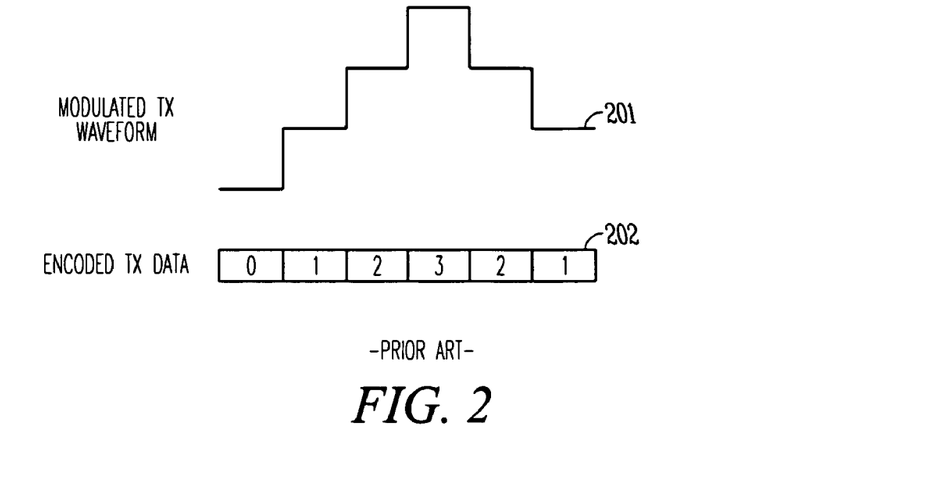
FIG. 2 illustrates a prior art 4-level pulse amplitude modulation analog waveform and the corresponding digital data.
Figure 3:
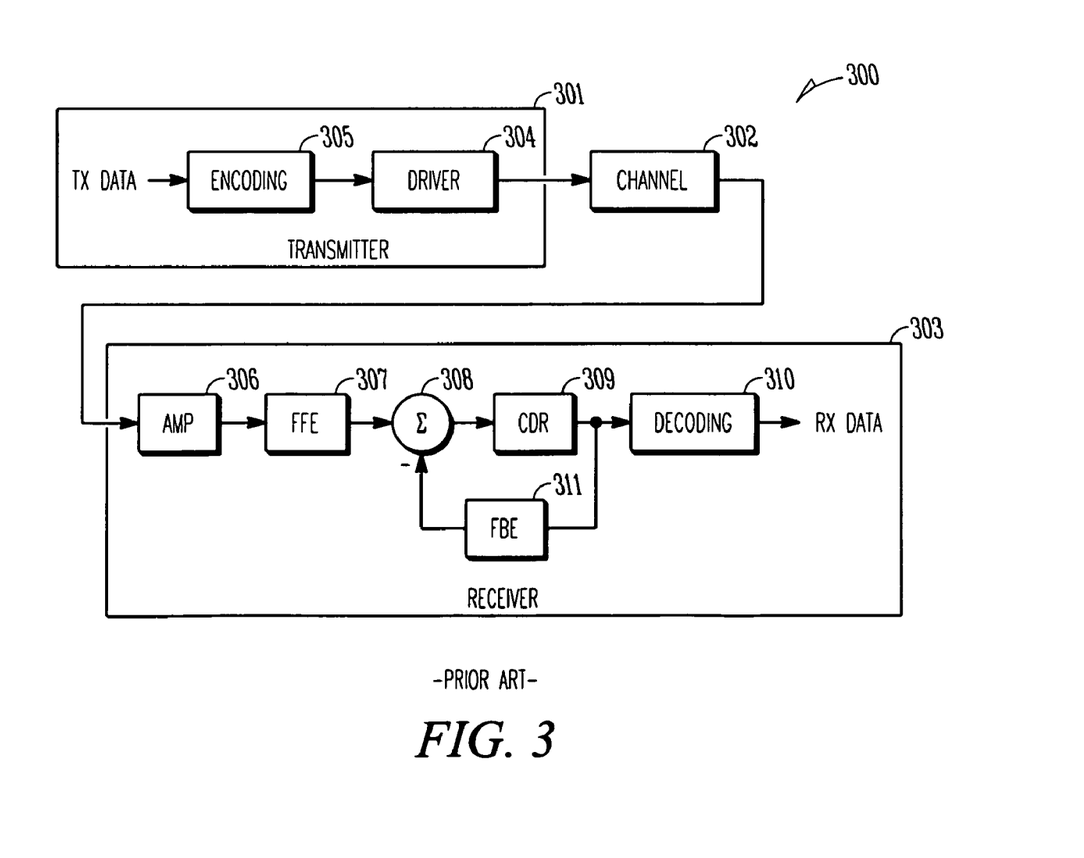
FIG. 3 illustrates a prior art communications system for a binary signaling scheme for non-return-to zero (NRZ) modulation.

The above described communication system of FIG. 1 applies to most communication systems that utilize multi-level modulation schemes. For example, PAM-4 (4-level pulse amplitude modulation) is a multi-level modulation scheme that converts the encoded TX data 202 into a 4-level analog waveform 201 as shown in FIG. 2. For a binary signaling scheme, for example, NRZ (non-return-to-zero), there is no need for using sophisticated ADC 110 and DAC 106 devices to handle the multi-level signaling, and the communication system 100 can be simplified, as shown in FIG. 3 as a modified communications system 300. Here, a line driver 304 generates either a high or low voltage depending on whether the encoded TX data (digital data to be transmitted) is 1 or 0. In the receiver 303, the decision unit, timing control unit, and VCO/NCO (voltage controlled oscillator or number controlled oscillator) of FIG. 1 are consolidated in a unit known as clock data recovery (CDR) 309, which reproduces the clock signal used by the remote transmitter 301 and recovers the encoded TX data sent by the remote transmitter 301 over channel 302. Remote transmitter 301 includes encoding 305. Receiver 303 also includes amp 306, FFE 307, summer 308, FBE 311, and decoding 310. The recovered data is labeled as RX data in FIG. 3.

Figure 4:
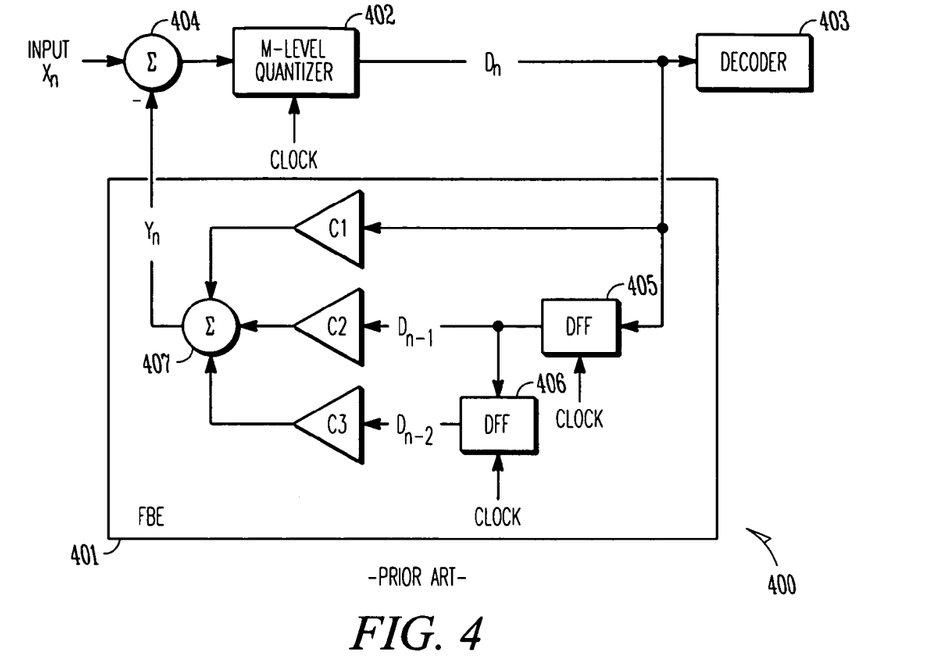
FIG. 4 illustrates a prior art 3-tap feedback equalizer used with an M-level quantizer.

A prior art feedback equalizer (FBE) 400 is shown in FIG. 4. Here, we show a 3-tap FBE 401. The M-level quantizer 402 is a decision device that determines the most likely level. The quantizer output is latched and synchronized by the local recovered clock signal. The quantizer output $D_n$, also known as the decision, is provided as input to the FBE 401. Inside the FBE, there are two Data Flip Flop (DFF) latches 405 and 406, which store the previous two decisions, $D_{n-1}$, and $D_{n-2}$. The three decisions (current decision $D_n$ from the quantizer 402, plus the previous two decision $D_{n-1}$, and $D_{n-2}$) are scaled by three respective gain factors C1, C2, and C3, and the results are summed at summation point 407 to generate the FBE output $Y_n$. The FBE output $Y_n$ is subtracted from the input $X_n$ at summation point 404 resulting in the modified input to the M-level quantizer 402 and thus forming a feedback loop.

One problem with the prior art FBE techniques is the critical path in the feedback loop. The critical path is the longest time delay path through a circuit that, in effect, sets the limit on the maximum operating speed of a circuit. In the example of FIG. 4, the current decision from quantizer output $D_n$ needs to be scaled by the gain factor C1, added at summation point 407 to the scaled outputs from the previous decisions two decision $D_{n-1}$, and $D_{n-2}$, and then subtracted from the quantizer input at summation point 404, and the result needs to be settled before the rising edge of next clock cycle. The output $D_n$ is coupled to decoder 403. For example, in 1 GHz operation of the feedback equalizer of FIG. 4, the contribution $Y_n$ needs to settle within 1 nanosecond (1 clock cycle at 1 GHz). This high speed equalization circuit implementation may be very difficult to achieve.

Figure 5:
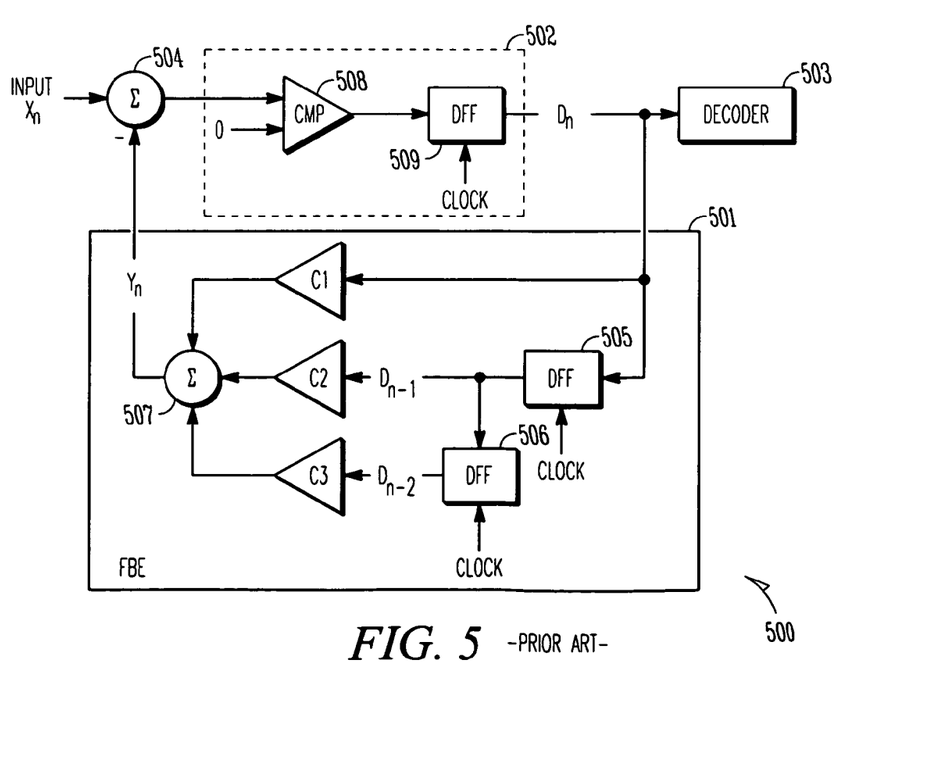
FIG. 5 illustrates a prior art feedback equalizer for non-return-to zero (NRZ) receiver with a 2-level quantizer.

An implementation of a prior art FBE for NRZ receiver is shown in FIG. 5. Note that NRZ is a binary signaling system employing two levels of amplitude, for example +1 and -1. The 2-level quantizer 502 of FIG. 5 can be implemented as a comparator 508 comparing the input, which is $X_n-Y_n$, versus the reference level 0. If the input is greater than the reference level 0, the comparator outputs +1. If the input is less than the reference level 0, the comparator outputs -1. In other words, the comparator outputs +1 if $X_n$ is greater than $Y_n$, otherwise it outputs -1. The comparator output is synchronized by the local recovered clock using a DFF 509, resulting in the current decision $D_n$, which is fed as input to the FBE 501, which includes DFF 505 and DFF 506. The output $D_n$ is coupled to decoder 503. The critical path problem in this example is the same as described above for FIG. 4. What is needed is a FBE that alleviates the critical path problem.

SUMMARY OF THE INVENTION

Methods, apparatus and systems for a new method of implementing a feedback equalizer that minimizes the critical path time in a multi-level modulation receiver. The critical path is reduced by parallel operation of some summation components of the feedback equalizer. The critical path is further reduced by pre-computing coefficients for the feedback equalizer. Further, the critical path is reduced using an adaptive feedback equalizer that uses parallelism or pre-computation to calculate the feedback equalization coefficients using an adaptation engine.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION OF THE INVENTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled.

In the following description, numerous specific details are set forth. However, it is understood that embodiments of the invention may be practiced without these specific details. In other instances, well-known circuits, structures and techniques have not been shown in detail in order not to obscure the understanding of this description. Additionally, in this description, the phrase "exemplary embodiment" means that the embodiment being referred to serves as an example or illustration. While the specification described several example embodiments of the invention considered best modes of practicing the invention, it should be understood that the invention can be implemented in many ways and is not limited to the particular examples described below or to the particular manner in which any features of such examples are implemented.

Figure 6:
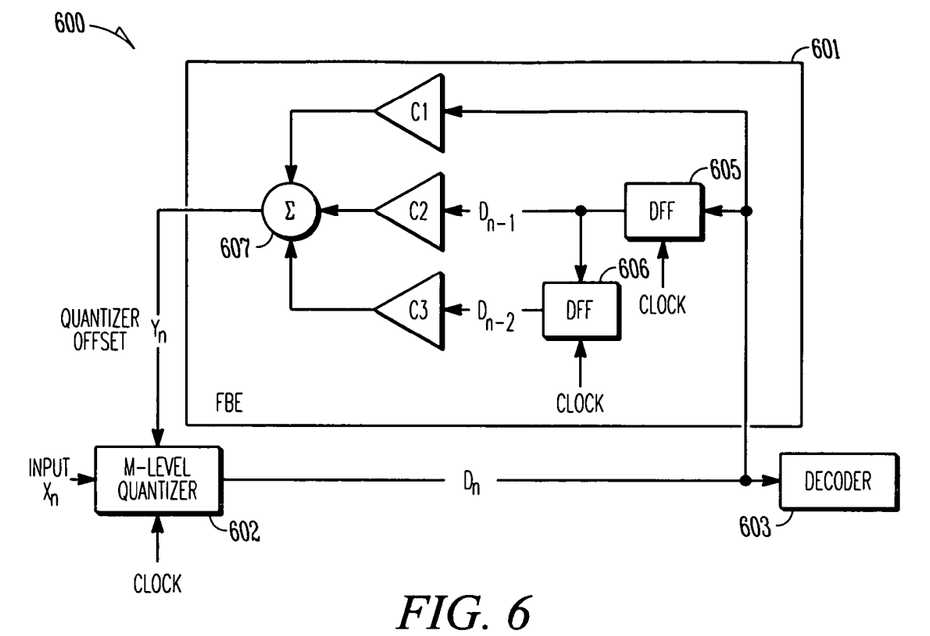
FIG. 6 is a block diagram illustrating a 3-tap feedback equalizer used with an M-level quantizer in accordance with some embodiments of the present invention.

FIG. 6 is a block diagram illustrating a 3-tap feedback equalizer 600 used with an M-level quantizer in accordance with some embodiments of the present invention. Instead of subtracting the FBE output $Y_n$ from the input to the quantizer input at a summation point, as was shown in the example of FIG. 4 above, the embodiment shown in FIG. 6 adjusts the quantizer levels by an offset of $Y_n$. Thus, FBE 601 output $Y_n$ as shown in FIG. 6 is applied to offset input of the quantizer 602. In this embodiment, the quantizer adjusts its internal reference level(s) according to the offset provided by the FBE 601, while the input $X_n$ is kept intact. FBE 601 includes DFF 605, DFF 606, and summer 607. The output $D_n$ is coupled to decoder 603. In this embodiment, the offset in the quantizer reference level is equivalent to a negative offset at the input so the effect of offsetting the quantizer level(s) is equivalent to offsetting the input. This improves the speed of the circuit of FIG. 6 by minimizing the critical path length through the circuit.

Figure 7:
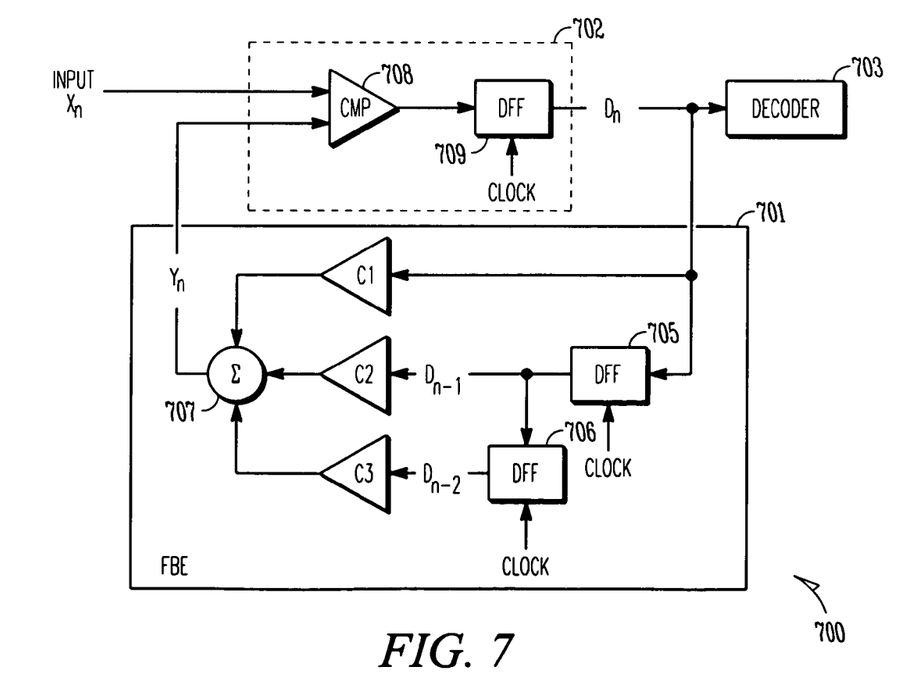
FIG. 7 is a block diagram illustrating a 3-tap feedback equalizer used with a 2-level quantizer in accordance with some embodiments of the present invention.

An exemplary embodiment of a FBE for non-return-to zero (NRZ) modulation according to some embodiments of the present invention is shown in FIG. 7. As described above in connection with the discussion of FIG. 5, NRZ is a binary or 2-level signaling system employing two levels of amplitude for which we will assign amplitude levels of +1 and −1 for this example. The 2-level quantizer 702 of communication system 700 of FIG. 7 is implemented as a comparator 708 comparing the input $X_n$ to the output $Y_n$, where 2-level quantizer 702 includes a DFF 709. $Y_n$ is output from FBE 701 that includes DFF 705 and DFF 706. In contrast to subtracting $Y_n$ from $X_n$ at a summation point and then comparing the result with a reference level 0 as shown in FIG. 5, the embodiment of the present invention shown in FIG. 7 directly compares $X_n$ with $Y_n$. In other words, the reference level is offset from 0 to Yn. The output $D_n$ is coupled to decoder 703. The result from the quantizer is similarly accurate or the same but the critical path in FIG. 7 is shortened because the original four-operand summation operation of FIG. 5 (utilizing summation points 507 and 504) is replaced by a three-operand summation 707 in FIG. 7.

Figure 8:
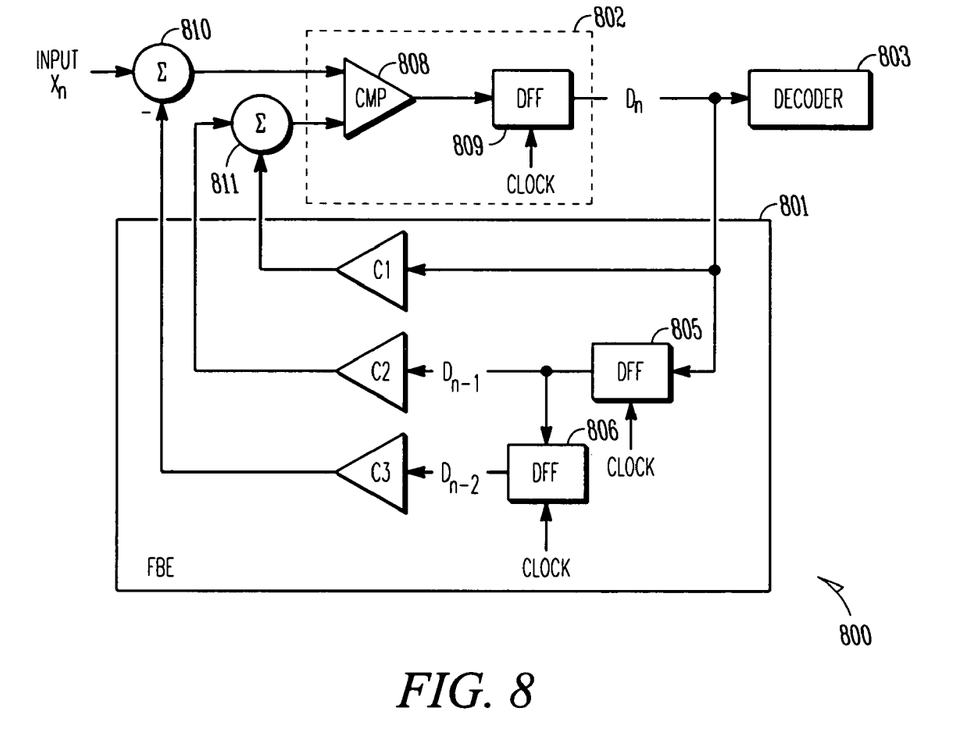
FIG. 8 is a block diagram illustrating a shortened critical path for a 2-level modulation communication system.

FIG. 8 is another embodiment of the present invention that results in a shorter critical path for a 2-level modulation communication system 800. The critical path is further reduced by distributing the feedback signals to two summation points 810, 811 operating substantially in parallel as shown in FIG. 8, and presenting the two summation results to the comparator input and the quantizer offset input, respectively. In this embodiment, the output of the FBE 801 is effectively $Y_n = C1 \times D_n + C2 \times D_{n-1} + C3 \times D_{n-2}$. As shown in FIG. 8, among the FBE outputs, the component $C3 \times D_{n-1}$ is subtracted from the input $X_n$ at summation point 810 while the remaining amount $C1 \times D_n + C2 \times D_{n-1}$ summed at summation point 811 is provided as an offset to the reference level input for comparator 808 of quantizer 802 that includes DFF 809. The output $D_n$ is coupled to FBE 801 that includes DFF 805 and DFF 806. The output $D_n$ is also coupled to decoder 803. The result is still accurate and the same, yet the critical path is further reduce to two substantially parallel two-operand summations.

Figure 9:
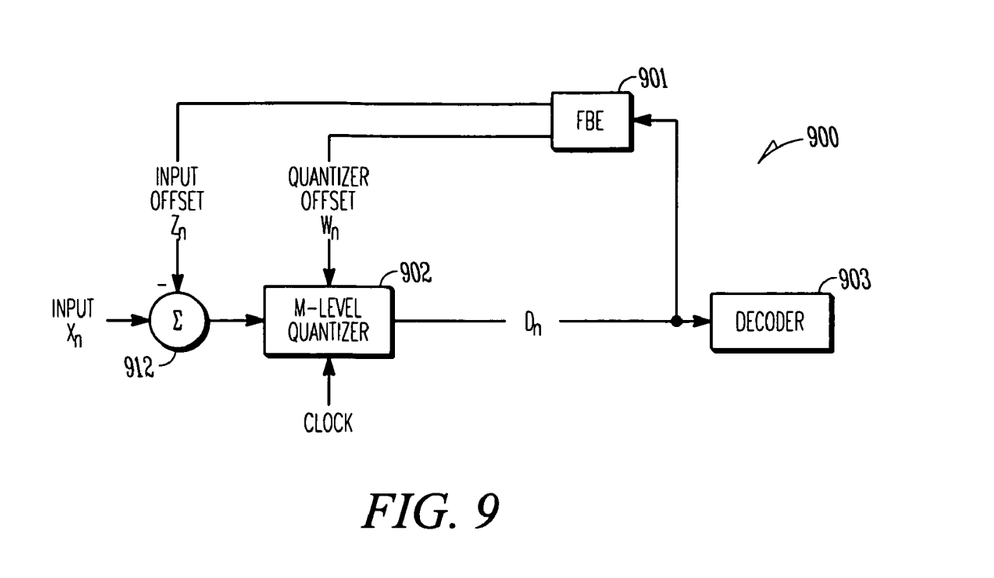
FIG. 9 is a block diagram illustrating an M-level feedback equalization for an M-level modulation communications system.

An M-level generalized embodiment of feedback equalization of communication system 900 in accordance with some embodiments of the present invention is shown in FIG. 9. In this embodiment, instead of generating a single FBE output $Y_n$ and subtracting it from the input $X_n$, the FBE 901 decomposes $Y_n$ into two outputs $W_n$ and $Z_n$, where $Y_n = W_n + Z_n$. Between the two FBE outputs, $W_n$ is provided to the M-level quantizer 902 as offset to its internal comparator(s), and $Z_n$ is subtracted from the input $X_n$ at summer 912. The quantizer output will be exactly the same as that in the prior art examples described above, but the critical path is substantially reduced and minimized by choosing an appropriate decomposition of $Y_n$ into $W_n$ and $Z_n$. The output $D_n$ is coupled to decoder 903.

Figure 10:
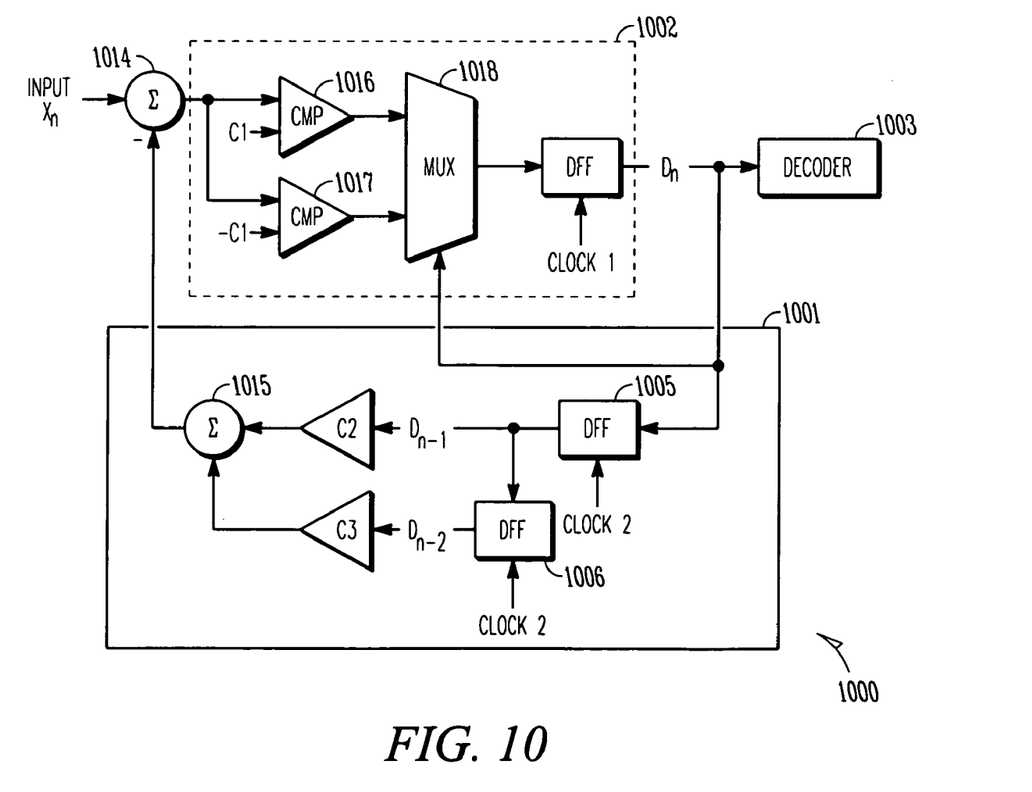
FIG. 10 is a block diagram illustrating a look-ahead equalization architecture using 2-level NRZ modulation as an example.

To further reduce the critical path in FBE, a look-ahead architecture is utilized in some embodiments of the present invention. An exemplary embodiment of a look-ahead architecture 1000 is given in FIG. 10 using NRZ as an example (2-level modulation), although the look-ahead architecture can be generalized to multi-level modulation for one skilled in the art upon studying the present specification. FIG. 10 shows an example of a 3-tap FBE 1001 where the FBE output is $Y_n = C1 \times D_n + C2 \times D_{n-1} + C3 \times D_{n-2}$. FBE 1001 includes DFF 1005, DFF 1006, and summer 1015. We can apply the $C1 \times D_n$ term as the offset to the quantizer 1002, and the remaining term $(C2 \times D_{n-1} + C3 \times D_{n-2})$ as the offset to the input $X_n$ at summation point 1014. However, instead of using the same clock for both the quantizer 1002 and the FBE 1001, we use two clocks: clock 1 and clock 2. Both clocks are synchronized to each other, but the phase of clock 2 is ahead of the phase of clock 1. In this manner, the critical path is the contribution of the $C1 \times D_n$ term, because it is triggered by clock 1 (which is trailing clock 2). Clock 2 is used for triggering the $(C2 \times D_{n-1} + C3 \times D_{n-2})$ term. For 2-level modulation such as NRZ, $D_n$ has two possible values: +1 and −1, and there are two possible comparator offsets: C1 and −C1, which depend on the value $D_n$. In this embodiment, the critical path is reduced by comparing (at parallel operating comparators 1016 and 1017) the input upfront at summation point 1014, which is $X_n - (C2 \times D_{n-1} + C3 \times D_{n-2})$ compared to the two possible reference levels: C1 and −C1. A multiplexer 1018 is used to choose between the two parallel comparator outputs based on the decision $D_n$. The critical path caused by the computation of the $C1 \times D_n$ term is then removed, because the two possible outcomes of $C1 \times D_n$ and therefore the two possible comparator outputs have been pre-computed. The output $D_n$ is coupled to decoder 1003.

In the embodiment of a multi-level quantizer with a look-ahead architecture, an M-level quantizer can be implemented as (M-1) comparators, having reference levels $L_1, L_2, \ldots,$ and $L_{M-1}$. The exemplary embodiments of binary (2-level) quantizers described above can be generalized to an M-level quantizer, wherein each of the (M-1) comparators adjusts its respective reference levels by the amount provided by the FBE. The look-ahead architecture can also be applied by pre-computing the input versus all possible reference values and then selecting the correct comparator output using the decision $D_n$ In an embodiment of an adaptive feedback equalizer, the FBE coefficients (C1, C2, and C3, etc) can be adapted by an adaptation engine. The adaptation algorithms, for example LMS (least mean square) are well known to those skilled in the art and thus not described here. In general, an adaptation algorithm adapts the coefficient, for example C2, in the following manner $$C1^{(next)} = C1^{(current)} \pm \Delta$$

Here, $\Delta$ is the increment (or decrement) to the coefficient. Several implementation schemes for the adaptation of the FBE coefficients in embodiments of the present invention are further presented here. For example, and not by way of limitation, a charge pump based adaptation or a switch coefficient adaptation algorithm may be used for the adaptation engine.

Figure 11:
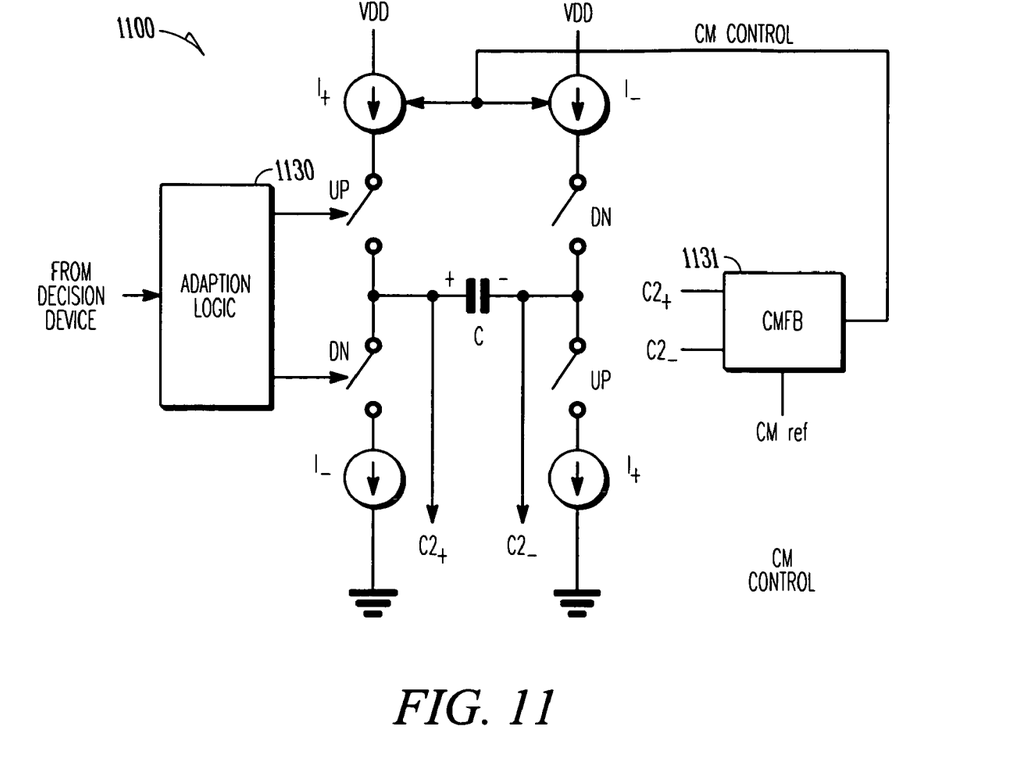
FIG. 11 is a block diagram illustrating a differential charge pump based adaptation engine for equalization in a multi-level modulation communication systems.

FIG. 11 shows a differential charge pump based adaptation 1100. The adaptation logic 1130 receives $D_n$ from the decision device and generates two control signals: UP and DN (for up and down, respectively). When UP=1 and DN=0, a current of $I_+$ is sourcing into the capacitor C. The voltage across C, which is $C2_+ - C2_-$ is increased accordingly. When UP=0 and DN=1, a current of $I_-$ is sinking from the capacitor C. The voltage across C, which is $C2_+ - C2_-$ is decreased accordingly. When UP=DN=0, no current is sourcing to or sinking from the capacitor C, therefore the voltage across C remains unchanged. The differential voltage $C2_+$ and $C2_-$, which forms the effective feedback coefficient C2 of the FBE, is thus adapted according to the control from the adaptation logic. Here, a common mode feedback circuit (CMFB) 1131 is used to establish the common mode or mean value of $C2_+$ and $C2_-$. The mean value of $C2_+$ and $C2_-$ is estimated and compared to a desired CM (common mode) reference. The error between the mean value and CM ref is used to control the currents $I_+$ and $I_-$, until the mean value reaches the desired reference.

Figure 12:
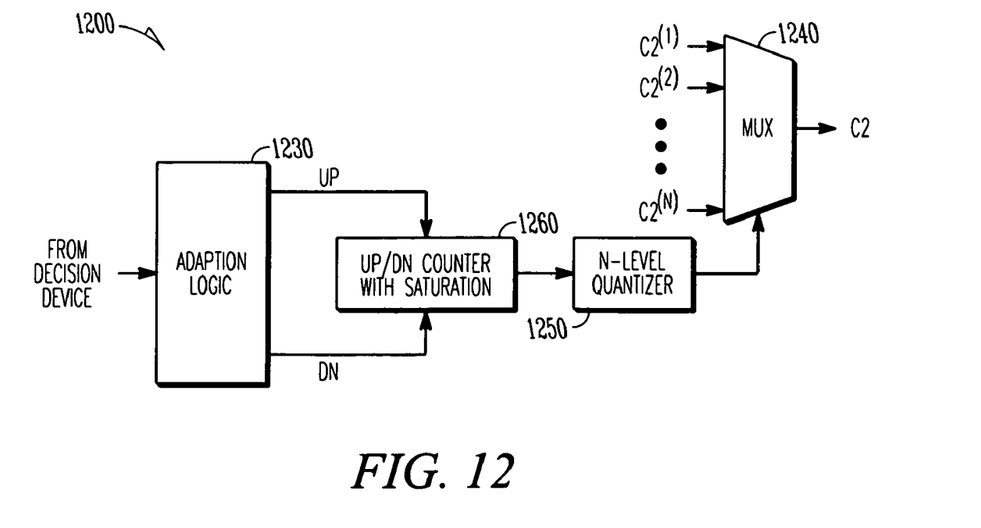
FIG. 12 is a block diagram illustrating a switch coefficient adaptation engine for equalization in a multi-level modulation communication systems.

A switch coefficient adaptation 1200 according to some embodiments of the present invention is shown in FIG. 12. Here, the coefficient C2 is limited to only N pre-defined levels, such as $C2^{(1)}, C2^{(2)}, \ldots,$ and $C2^{(N)}$. Again, the adaptation logic 1230 receives $D_n$ from the decision device and generates two control signals: UP and DN (for UP and DOWN, respectively). An up/down counter 1260 increments if UP=1 and DN=0, decrements if UP=0 and DN=1, and remains unchanged for any other combined value of UP and DN. The up/down counter 1260 also saturates when it reaches a pre-determined maximum value, or a pre-determined minimum value. The counter output is quantized by N-level quantizer 1250 into one of the N possible values from 1 to N. The quantizer output is provided as the selection control input to multiplexer 1240 to select one of the N pre-defined levels of the coefficient C2. Thus, this embodiment also generally operates for multi-level modulation schemes.

CONCLUSION

Although specific embodiments have been illustrated and described herein, it will be appreciated by those of ordinary skill in the art that any arrangement which is calculated to achieve the same purpose may be substituted for the specific embodiments shown. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the invention includes any other implementations in which the above structures, apparatus, systems, method and computer-readable media are used.

What is claimed is:

1. A method comprising:
   receiving a sequence of input samples;
   sequentially making a decision for each of the input samples using a decision device;
   providing the decision output to a feedback equalizer;
   providing an offset from the feedback equalizer to the decision device such that each input sample is input to the decision device unaltered by the feedback equalizer, the offset generated in the feedback equalizer using a previous decision output;
   adjusting an internal reference in the decision device based on the offset; and
   providing a decision from the decision device for the next input sample after adjusting the internal reference.

2. The method of claim 1, wherein the method includes scaling the decision output by a gain factor;
   scaling one or more previous decision outputs, each previous decision output scaled by an associated gain factor; and
   combining the scaled decision output with scaled one or more previous decision outputs to provide the offset.

3. The method of claim 1, wherein adjusting an internal reference includes providing the offset as the internal reference.

4. The method of claim 3, wherein providing the offset as the internal reference includes providing the offset to a comparator of the decision device.

5. The method of claim 1, wherein receiving a sequence of input samples includes deriving the sequence of imput samples from signals received from a communication channel.

6. The method of claim 1, wherein the decision device is a multi-level quantizer.

7. The method of claim 1, wherein the method includes using a multi-level quantizer having a plurality of levels, M, and M-1 comparators and adjusting an internal reference to each comparator based an offset provided from the feedback equalizer.

8. The method of claim 1, wherein providing an offset from the feedback equalizer to the decision device includes using feedback equalizer coefficients provided by an adaptation engine.

9. The method of claim 1, wherein the method is performed in receiving non-return-to-zero input samples.

10. A method comprising:
    receiving a sequence of input samples;
    sequentially making a decision for each of the input samples using a decision device;
    providing the decision output to a feedback equalizer;
    providing an offset from the feedback equalizer to the decision device;
    adjusting an internal reference in the decision device based on the offset; and
    providing a decision from the decision device for the next input sample after adjusting the internal reference, wherein the method includes:
       decomposing an output from the feedback equalizer into a first output and a second output, the feedback equalizer output being the sum of the first output and the second output;
       providing the first output as the offset to the decision device;
       subtracting the second output from a signal input to form a modified input; and
       providing the modified input to the decision device.

11. The method of claim 10, wherein the method includes:
    generating the first output as the decision output scaled by a gain factor, the decision output provided using a first clock;
    providing one or more previous decision outputs using a second clock; and
    generating the second output as the sum of the one or more previous decision outputs scaled by an associated gain factor.

12. The method of claim 11, wherein the method includes providing the first clock and the second clock synchronized to each other, the first clock having a first phase and the second clock having a second phase, the second phase being in advance of the first phase.

13. The method of claim 11, wherein the method includes comparing the modified input with internal reference levels of the decision device, which are based on the offset provided from the first output.

14. The method of claim 13, wherein the method includes choosing a comparison output from comparing the modified input with the internal reference levels.

15. The method of claim 14, wherein choosing a comparison output includes using a multiplexer to select the comparison output based on the first output of the feedback equalizer.

16. A receiver comprising:
    a decision device having an internal reference and having an input to receive input samples; and
    a feedback equalizer coupled to the decision device to receive a decision output as an input, the feedback equalizer configured to provide an offset to the decision device to adjust the internal reference such that each input sample is input to the decision device unaltered by the feedback equalizer, the feedback equalizer configured to use a previous decision output to generate the offset in the feedback equalizer.

17. The receiver of claim 16, wherein the feedback equalizer includes
    one or more storage units to store previous decision outputs;
    a plurality of gain units, a gain unit to scale the current decision output and one or more other gain units to scale the one or more previous decision outputs; and
    a summer to combine outputs from the plurality of gain units, the summer having an output to provide the offset.

18. The receiver of claim 17, wherein the one or more storage units include one or more data flip flops.

19. The receiver of claim 16, wherein the internal reference of the decision device is set by the offset.

20. The receiver of claim 16, wherein the decision device includes a comparator having the internal reference as an input.

21. The receiver of claim 16, wherein the decision device is configured to receive an input signal derived from a communications channel, the input signal unaltered by the feedback equalizer.

22. The receiver of claim 16, wherein the receiver includes a clocking system to provide the settled decision from the decision device within one clock cycle.

23. The receiver of claim 16, wherein the decision device includes using a multi-level quantizer having a plurality of levels, M, and M-1 comparators, each comparator having an internal reference based on offsets from the feedback equalizer.

24. The receiver of claim 16, wherein the feedback equalizer includes an adaptation engine to adaptively provide feedback equalizer coefficients to provide the offset.

25. The receiver of claim 16, wherein the receiver is receiving a non-return-to zero signal.

26. A receiver comprising:
a decision device having an internal reference; and
a feedback equalizer coupled to the decision device to receive a decision output as an input, the feedback equalizer configured to provide an offset to the decision device to adjust the internal reference, wherein the feedback equalizer includes two outputs, a first output providing the offset to the decision device and a second output providing an input to a summer, the summer coupled to the decision device, the summer to receive an input signal derived from a communications channel to provide a modified input to the quantizer, the modified input being the difference from the input signal and the input to the summer from the feedback equalizer.

27. The receiver of claim 26, wherein the second output is configured to provide the input to the summer, the input correlated to one or more previous decision outputs.

28. The receiver of claim 26, wherein the receiver includes:
a first clock to operate the decision device; and
a second clock to operate the feedback equalizer, the first clock and the second clock synchronized to each other, the first clock having a first phase and the second clock having a second phase, the second phase being in advance of the first phase.

29. The receiver of claim 28, wherein the decision device includes one or more comparators to compare the modified input with internal reference levels of the decision device, the internal reference levels based on the offset.

30. The receiver of claim 29, wherein the decision device includes a multiplexer to choose a comparison output based on outputs from the one or more comparators and the decision output.

* * * * *

UNITED STATES PATENT AND TRADEMARK OFFICE
CERTIFICATE OF CORRECTION

PATENT NO. : 7,567,616 B2　　　　　　　　　　　　　　　　　　　　Page 1 of 1
APPLICATION NO. : 11/230856
DATED : July 28, 2009
INVENTOR(S) : Lin It is certified that error appears in the above-identified patent and that said Letters Patent is hereby corrected as shown below:

In column 7, line 30, in Claim 5, delete "imput" and insert -- input --, therefor.

Signed and Sealed this

Fifteenth Day of September, 2009

David J. Kappos
*Director of the United States Patent and Trademark Office*